(12) United States Patent
Davies et al.

(10) Patent No.: US 8,391,653 B2
(45) Date of Patent: Mar. 5, 2013

(54) DEVICE FOR APPLYING A FIBER-OPTIC MONITORING SYSTEM TO A COMPONENT TO BE MONITORED

(75) Inventors: Martin Vincent Davies, Eastleigh (GB); Stephen John Millard, Eastleigh (GB); Kris Jonathan Roberts, Eastleigh (GB)

(73) Assignee: Prysmian Cables & Systems Limited, Hampshire (GB)

( * ) Notice: Subject to any disclaimer, the term of this patent is extended or adjusted under 35 U.S.C. 154(b) by 210 days.

(21) Appl. No.: 12/745,078

(22) PCT Filed: Nov. 29, 2007

(86) PCT No.: PCT/EP2007/063005
§ 371 (c)(1),
(2), (4) Date: Sep. 23, 2010

(87) PCT Pub. No.: WO2009/068095
PCT Pub. Date: Jun. 4, 2009

(65) Prior Publication Data
US 2011/0026872 A1 Feb. 3, 2011

(51) Int. Cl.
*G02B 6/00* (2006.01)
*G01D 5/353* (2006.01)
*G01R 31/00* (2006.01)
*G01L 1/24* (2006.01)

(52) U.S. Cl. ............ 385/12; 385/134; 385/140; 324/96; 73/800

(58) Field of Classification Search ............... 385/12, 385/13, 134, 88, 89, 92, 140; 73/800, 766; 405/274; 166/250.01; 250/227.11, 227.14; 324/96
See application file for complete search history.

(56) References Cited

U.S. PATENT DOCUMENTS

| | | | | |
|---|---|---|---|---|
| 4,538,527 A | * | 9/1985 | Kitchen | 109/21 |
| 5,306,088 A | * | 4/1994 | Zoerner | 374/131 |
| 5,637,865 A | | 6/1997 | Bullat et al. | |
| 6,188,645 B1 | | 2/2001 | Maida, Jr. et al. | |
| 6,256,588 B1 | | 7/2001 | Maida, Jr. et al. | |
| 7,398,697 B2 | * | 7/2008 | Allen et al. | 73/800 |
| 7,608,812 B2 | * | 10/2009 | Beinhocker | 250/227.14 |
| 7,646,945 B2 | * | 1/2010 | Jones et al. | 385/13 |
| 2004/0240769 A1 | | 12/2004 | Spirin et al. | |
| 2006/0001863 A1 | | 1/2006 | Kishida et al. | |

(Continued)

FOREIGN PATENT DOCUMENTS

DE 43 32 501 A1 3/1995
JP 2004-092523 3/2004

(Continued)

OTHER PUBLICATIONS

International Search Report from the European Patent Office in International Application No. PCT/EP2007/063005 mailed Sep. 29, 2008.

(Continued)

*Primary Examiner* — Brian Healy
(74) *Attorney, Agent, or Firm* — Finnegan, Henderson, Farabow, Garrett & Dunner, L.L.P.

(57) ABSTRACT

An adapter device for applying a fiber-optic monitoring system to a component to be monitored includes a shell adapted to surround the component to be monitored, the shell having a rounded exposed surface onto which a first optical fiber of the fiber-optic monitoring system can be wrapped.

13 Claims, 9 Drawing Sheets

U.S. PATENT DOCUMENTS

2006/0045408 A1* 3/2006 Jones et al. .................. 385/12
2011/0026872 A1* 2/2011 Davies et al. ................. 385/12
2012/0073804 A1* 3/2012 Harman et al. .......... 166/250.01

FOREIGN PATENT DOCUMENTS

| JP | 2004-309219 | 11/2004 |
|----|-------------|---------|
| WO | WO 97/36150 | 10/1997 |
| WO | WO 2005/038423 A1 | 4/2005 |

OTHER PUBLICATIONS

International Search Report issued by European Patent Office for International Application No. PCT/US2004/025755 on Mar. 3, 2005 (3 pages).

* cited by examiner

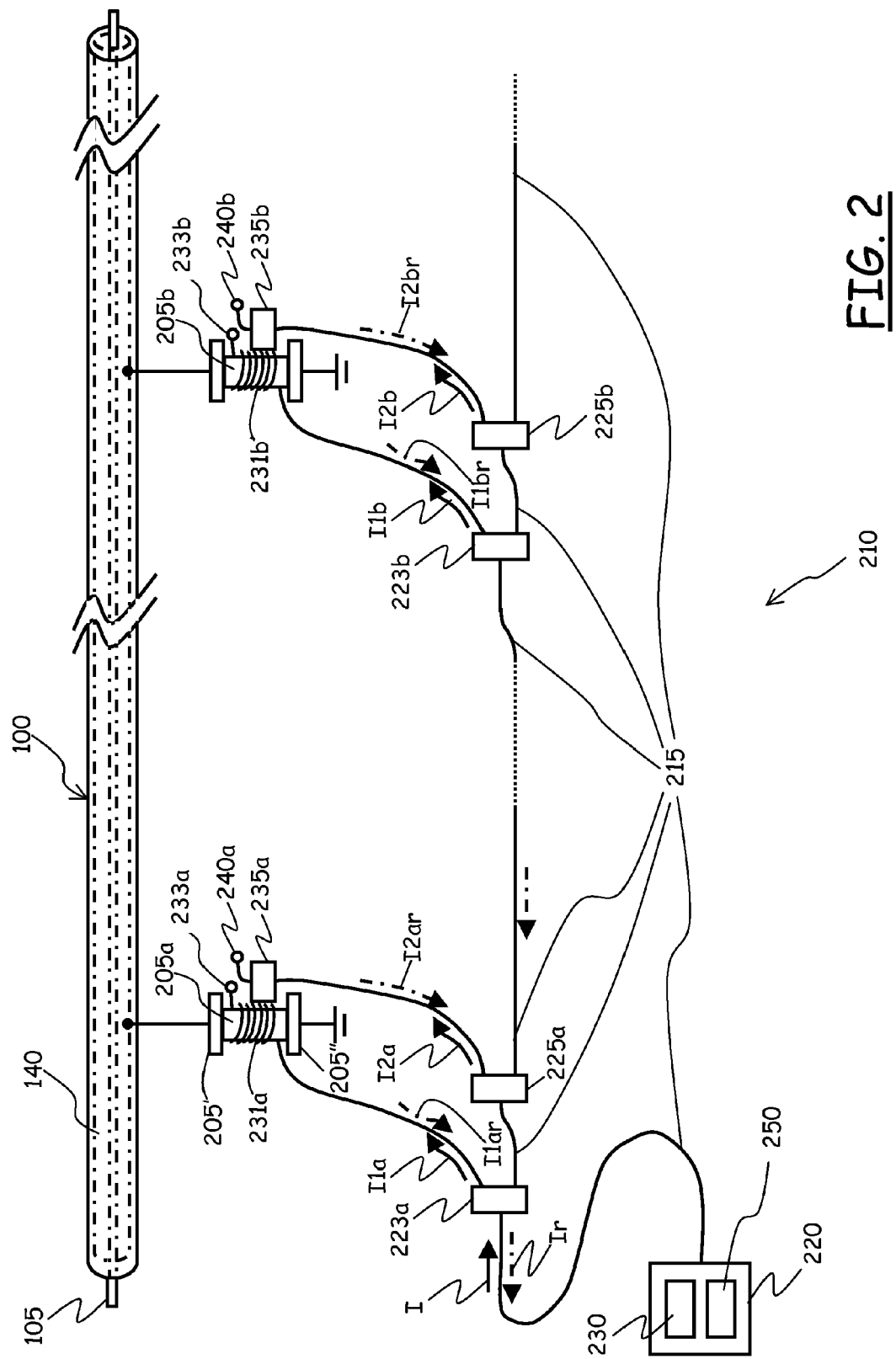

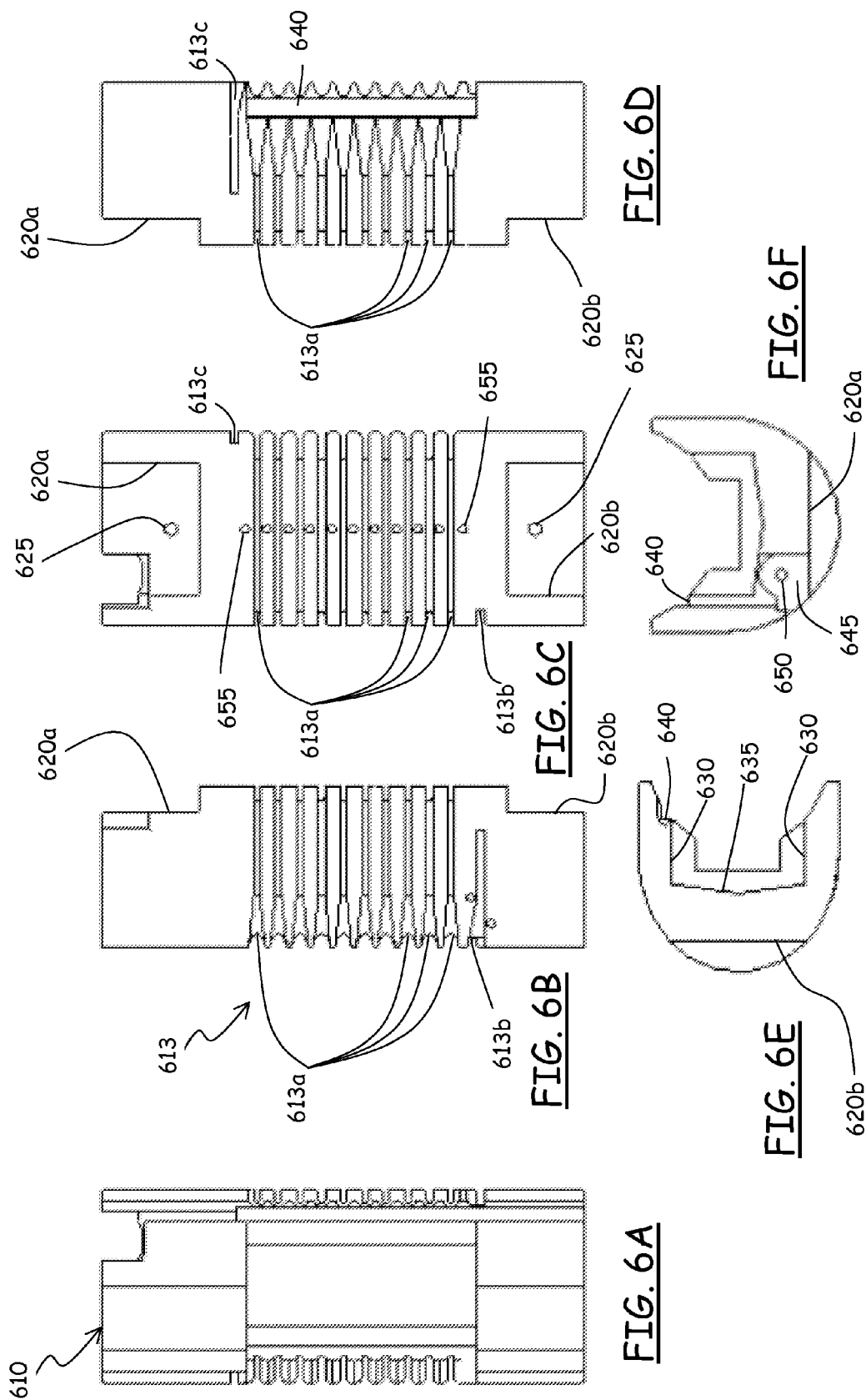

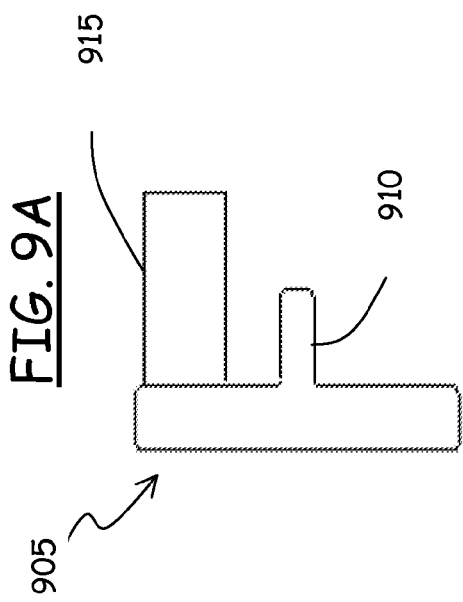
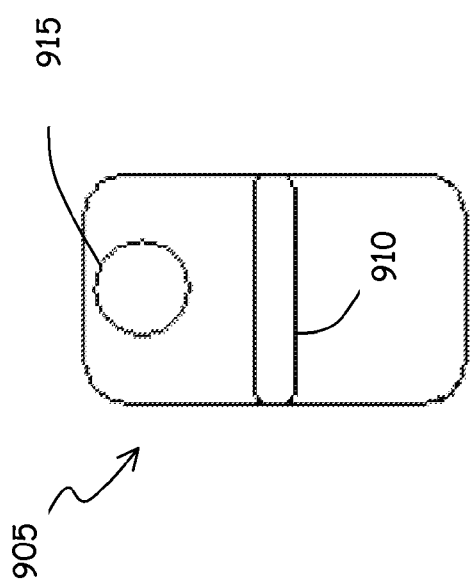
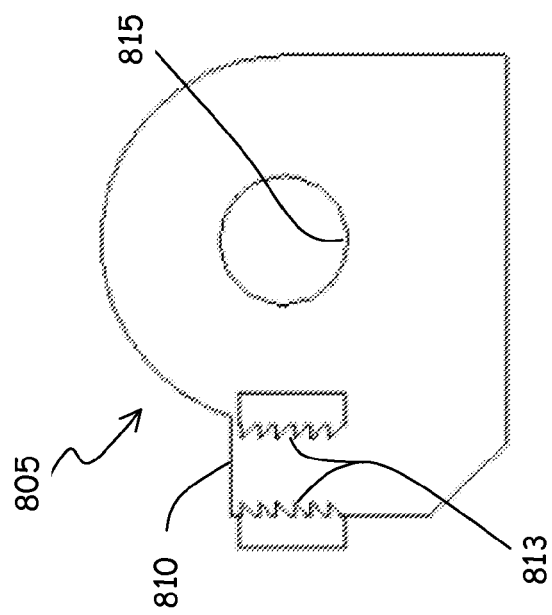
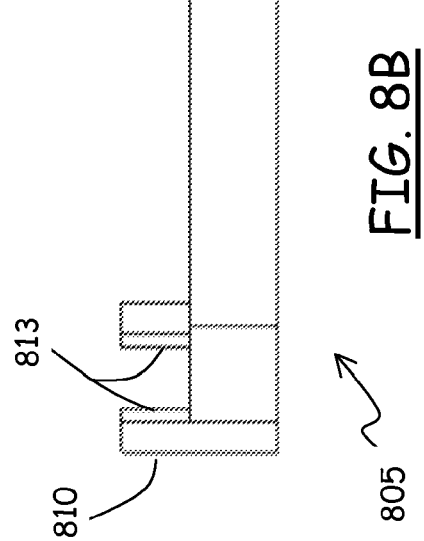

DEVICE FOR APPLYING A FIBER-OPTIC MONITORING SYSTEM TO A COMPONENT TO BE MONITORED

CROSS REFERENCE TO RELATED APPLICATION

This application is a national phase application based on PCT/EP2007/063005, filed Nov. 29, 2007, the content of which is incorporated herein by reference.

BACKGROUND OF THE INVENTION

1. Field of the Invention

The present invention relates to methods and systems for monitoring the state of components distributed in a plurality of spatial locations, particularly, although not limitatively, electric power distribution system components. In particular, the present invention relates to the monitoring, in real time and by using optical fibers, of the state and condition of components such as "ancillary" elements, for example protection elements, used in electric power distribution systems for ensuring the system security. Specifically, the present invention concerns a device for applying a fiber-optic monitoring system to a component to be monitored.

2. Description of Related Art

Distribution systems of electric power comprise distribution networks, for example high voltage (HV) distribution networks.

The term "high voltage" is related to voltages higher than 35 kV, reaching also one or more hundreds of kilovolts.

The electric power distribution networks make use of cables that may, for example, be aerial (overhead) or underground, for example positioned in tunnels.

In addition to cables, electric power distribution networks can comprise a number of different ancillary elements that, strictly speaking, do not play a direct role in the electric power distribution, being instead used to guarantee proper conditions of usage and security of the distribution line.

Examples of ancillary elements are Surge Voltage Limiters (SVLs), also known as Surge Arresters (SAs) or surge suppressors or Sheath Voltage Limiters (SVLs), oil pressure monitoring systems for oil-filled cables, thermometers to check the pumps for circulating cooling water and the cooling water temperature itself.

The environment where the cables are located can be critical, because recessed, and/or dangerous, like in the case of HV networks. Thus, the monitoring and the maintenance of the ancillary elements of an electric power distribution cable may be cumbersome and cannot be carried out on a frequent time basis. Even when the ancillary elements are not enclosed in protective boxes, the monitoring of their operating conditions can imply long inspections and/or the interruption of the distribution of the electric power.

This is indeed strongly undesired, because an electric power distribution line normally supplies a very large area and a substantial number of users, which are never ready to accept a service interruption.

There is therefore the need of devising a solution to the problem of monitoring the proper operation of ancillary elements (like SVLs, oil pressure monitoring systems, thermometers) with the aim of being able to replace them as readily as possible when they break.

In the published Japanese patent application JP 04-092523, a detecting sensor for contact information is described, to detect the contact information with no mechanical force applied. Light shading mechanisms are provided and operate by the contact information between optical branches devices and mirrors provided at plural areas of an optical fiber.

The Applicant observed that said shading mechanisms are of the active type, i.e. they require an outer energy source to operate. Particularly, in the examples an electric power supply is provided. No application to power cables is envisaged In the published Japanese patent application JP 2004309219, a sensor measuring system is disclosed, comprising a plurality of fiber measuring sensors for measuring a number of physical quantities.

The Applicant observed that the sensors are positioned in series on a main optical fiber, not on the branching thereof, therefore intensity reduction in one of them lessens the amount of light available in the following sensors, thereby reducing the measurement dynamics.

The published U.S. patent application 2004/0240769 describes an alarm condition distributed fiber optic sensor with storage transmission-reflection analyzer. The Applicant observed that both transmission and reflection detectors are electrically connected to the storage transmission-reflection analyzer.

SUMMARY OF THE INVENTION

The Applicant faced the problem of monitoring the change of a physical quantity (e.g. temperature, magnetic effect) in a set of components distributed in different spatial locations, particularly, albeit not limitatively, a set of ancillary elements (e.g., surge arresters) distributed in different positions along an electric power distribution network.

The Applicant has observed that critical environments where the components to be monitored are located (e.g. high voltage and/or recessed power cables) would imply the fulfillment of a number of requirements:

- the monitoring system should be passive;
- the position (and, possibly, the moment) of the occurrence of change of a physical quantity should be remotely identified, with no need of direct inspections, which are often difficult or even impossible to be carried out;
- the monitoring system should be able to recognize and identify multiple changes of a physical quantity occurring substantially at the same time in different positions.
- preferably, the monitoring system should be able to recognize and identify changes of a physical quantity irrespective from the duration thereof (the system reaction should be faster than the monitored event duration, however the detection time can be longer than the event duration).

In the present description and claims, the term "passive" is intended for a device or component not requiring a dedicated energy source for performing the intended function. Such a device or component can be activated by a physical phenomenon generated by, e.g., a surge (transient sudden rise of current or voltage in an electrical circuit) or fault or disturbance, with no need of other power feeding devices, e.g. battery. In particular, neither electrical energy nor mechanical energy are needed. Indeed, the presence of local feeding devices for the monitoring device or component could give rise to the same problems and troubles set for the above in connection with the ancillary elements.

In particular the Applicant observed that, depending on the specific application and on the physical shape of the components to be monitored, applying a fiber-optic monitoring system to the components to be monitored may pose some problems. In particular, the Applicant observed that the components to be monitored may have an irregular shape and thus they may not provide a suitable uniform surface for receiving the optical elements of the fiber-optic monitoring system. This is the case, for example, of the surge arresters which are generally provided with irregular outer surfaces that may cause excessive bending of an optical fiber as part of the fiber-optic monitoring system. Excessive bending of the optical fiber which is attached to the component to be monitored, e.g. a surge arrester, may induce bending losses that impair the functionality of the monitoring system as a whole.

The Applicant thus faced the problem of properly and safely applying a fiber-optic monitoring system to one or more components to be monitored.

According to an aspect thereof, the present invention relates to an adapter device for applying a fiber-optic monitoring system to components to be monitored, distributed in different space locations, particularly albeit not limitatively ancillary elements of an electric power distribution network like surge arresters.

The adapter device comprises a shell adapted to surround the component to be monitored, the shell having a rounded exposed surface onto which a first optical fiber of the fiber-optic monitoring system can be wrapped.

Said outer surface may preferably comprise grooves for accommodating and keep in position the optical fiber to be wrapped onto the shell.

At least one optical fiber retaining member may be provided, adapted to prevent the first optical fiber from escaping from said grooves.

The adapter device may comprise an inner seat adapted to accommodate and keep close to the component to be monitored a second optical fiber of the fiber-optic monitoring system.

An optical fiber cable grip element may preferably be provided, adapted to anchor a free end of the second optical fiber to said shell.

Said shell may comprise at least a first and a second shell halves, adapted in use to embrace therebetween the component to be monitored.

At least one tying member may be provided, adapted to tie the at least a first and a second shell halves to each other.

Said at least one tying member may comprise at least one adhesive band, or, preferably, at least one bracket.

The adapter device may comprise an outer cover adapted in use to externally cover the exposed surface of said shell. The outer cover may comprise at least a first and a second cover halves, adapted in use to embrace therebetween the shell.

The adapter device may be used in association with components to be monitored like surge arresters for electric power distribution lines.

Another aspect of the present invention relates to the use of such an adapter device in a system for monitoring a plurality of components distributed in different space locations, the system comprising:
at least one optical fiber path;
an optical radiation source adapted to inject an optical radiation into the at least one optical fiber path;
at least one first and at least one second optical branches branching from the at least one optical fiber path and adapted to spill respective portions of said optical radiation, the first and second optical branches being adapted to be operatively associated with a respective component to be monitored, wherein:
the first optical branch comprises a first optical reflector and is adapted to reflect the spilled optical radiation portion, unless the respective component at least partially breaks;

the second optical branch comprises:
at least one passive optical attenuator adapted to be operatively coupled to the respective component to be monitored, and having an attenuation capable of changing in response to a change in operating conditions of the respective monitored component when operatively coupled thereto, and
a second optical reflector;
an optical receiver adapted to detect back-reflected optical radiation reflected by said first and second optical branches.

For the purpose of the present description and claims:
by "optical source" it is intended a source of optical radiation adapted to propagate through an optical fiber; examples of optical sources are lasers and OTDR apparatuses;
by "optical receiver" it is meant a device detecting an optical signal, converting it into an electrical signal, and processing the electrical signal as required for further use; examples of optical receivers are OTDR apparatuses and Optical Spectrum Analyzers (OSAs);
by "optical attenuator" it is intended a device adapted to alter the intensity of an optical radiation transmitted through an optical fiber; a special case of optical attenuator is an optical shutter, which is a device adapted to either substantially stop the optical radiation or let the optical radiation pass through; for the purposes of the present invention, such a device is activated by an external physical phenomenon related to the physical quantity the change of which is monitored;
by "splitter" or "directional coupler" it is meant an optical coupling device for separately coupling or splitting optical signals (in a known coupling loss) in a transmission line;
by "coupling" it is meant the transfer of energy from one optical fiber to another or a branch thereof in a splitter;
by "Fresnel reflection" it is intended the reflection of optical radiation predicted by the Fresnel equations describing the behavior of light when moving through media of differing refractive indices; for common glass, the reflection coefficient is about 4%; such a reflection occurs, as an example, at the end of an optical fiber (either cleaved or broken) when the angle between the fiber axis (corresponding to the direction of propagation of the photons within the fiber) and the fiber end surface is lower than the optical critical angle. When light moves from a dense to a less dense medium, such as from glass to air, Snell's law cannot be used to calculate the refracted angle when the resolved sine value is higher than 1: at this point, light is reflected in the incident medium, an effect known as internal reflection. Before the light ray totally internally reflects, the light refracts at the critical angle; it travels directly along the surface between the two refractive media, without a change in phases like in other forms of optical phenomena;
by "reflector", it is meant a device adapted to send a portion of optical radiation back to where it came from (like a mirror); an example of reflector is a surface resulting from a cut substantially perpendicular)(80-90°) to the longitudinal axis of an optical fiber, said surface being optionally covered by a reflecting material, e.g. gold; typically the reflector is part of a reflective pigtail (a pigtail is a terminal segment of an optical fiber having a free, unconnected end); another example of reflector is a fiber grating;
by "back-reflected optical radiation" it is intended the portion of optical radiation that, after having been reflected by the reflector, propagates back towards the optical receiver; the back-reflected optical radiation has characteristics that are typical of an optical radiation, and characteristics that may be imparted to the optical radiation by the optical attenuator and/or the reflector; examples of characteristics of the back-reflected optical radiation are: the intensity (as a function of time), the polarization state, the wavelength, the radiation spectrum, the frequency of switching between two discrete values of intensity; the propagation delay from where the back-reflected optical radiation is reflected back to the optical receiver.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

BRIEF DESCRIPTION OF THE DRAWINGS

The features and advantages of the present invention will be made apparent by reading the following description of some embodiments thereof, provided by way of exemplary and non-limitative examples, description that it is referred to the annexed drawings, wherein:

FIG. 2 schematically shows a monitoring system, applied to an electric power distribution system for monitoring the SVLs protecting it, wherein a device according to an embodiment of the present invention can be exploited;

FIGS. 6A to 6F are different views of one of the two half shells of the device of FIG. 5;

FIGS. 8A and 8B are different views of a cable grip element for anchoring an end of the optical fiber of the second optical branch of the monitoring system of FIG. 2 to one of the two half-shells of the device;

FIGS. 9A and 9B are different views of a fiber retaining member for retaining the optical fiber of the first branch of the monitoring system to be wrapped around the device of FIG. 5.

DETAILED DESCRIPTION OF THE PREFERRED EMBODIMENTS OF THE INVENTION

The present invention concerns a device for applying a fiber-optic monitoring system to at least one component to be monitored. The device according to an embodiment of the present invention can be advantageously used in fiber-optic monitoring systems for monitoring ancillary components of an electric power distribution network. In particular, the components to be monitored may be components associated with the electric power distribution network for protection thereof. In particular, the components to be monitored are surge arresters.

Figure 1:
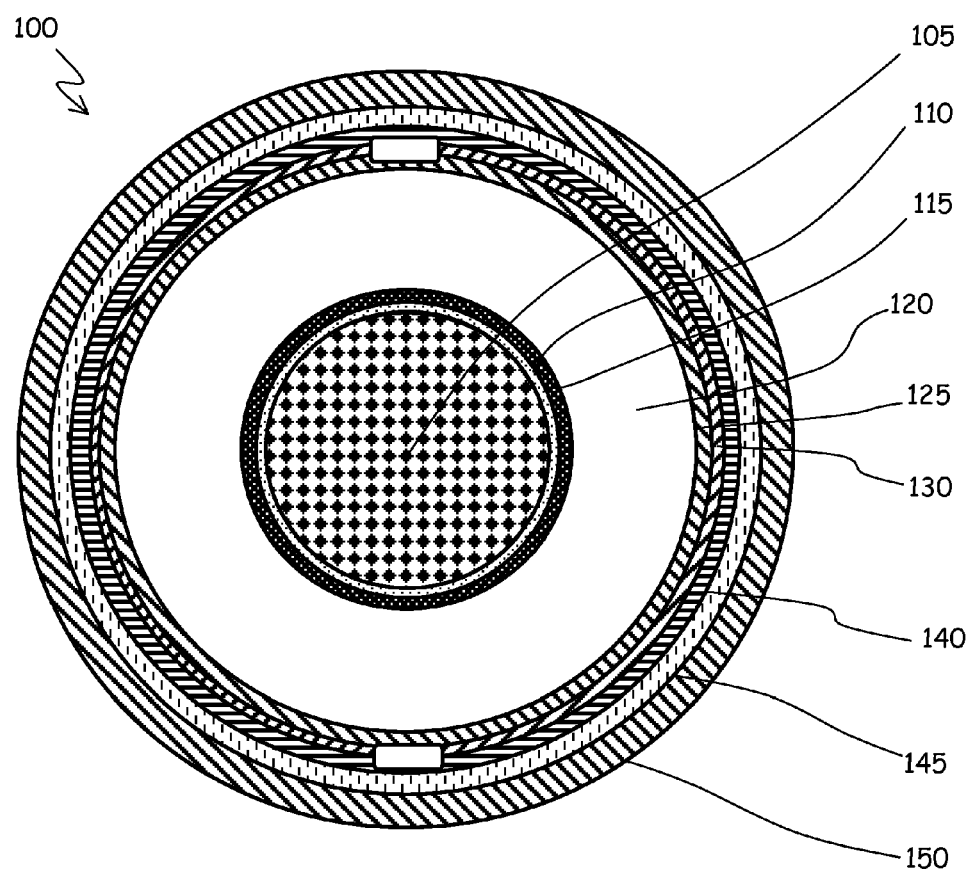
FIG. 1 shows, in cross section, a cable used in HV electric power distribution systems, a scenario where the present invention can be usefully applied.

FIG. 1 shows, in cross section, a cable 100 for HV electric power distribution networks; particularly a single-core cable. The cable 100 comprises, starting from the center thereof and moving radially outwards, a central conductor 105, a binder 110, made of a semi-conductive tape, a conductor screen 115, made of a semi-conductive polymer, an insulation layer 120 made, for example, of cross-linked polyethylene (XLPE), an insulation screen 125, also made of a semi-conductive polymer, a semi-conductive water barrier 130, made for example of a semi-conductive hygroscopic tape, a metallic sheath 140, made of a metal sheet, a jacket 145 of high-density polyethylene (HDPE), and finally a protective coating 150, typically semi-conductive. The cable 100 can be used both in aerial applications or underground.

The metallic sheath 140 has primarily the function of making the electromagnetic field uniform around the conductor 105.

Phenomena like lightning, switch-on maneuvers of the electric power distribution network, line-to-line ground faults, load rejection, ferroresonance, just to cite a few, can cause a voltage rise in the metallic sheath to unacceptably high values, e.g. higher than 1 KV. In order to protect the cable 100 from detrimental over-voltages (surges), ancillary elements, particularly SVLs are used.

Typically, a plurality of SVLs is coupled to an electric power distribution cable like cable 100, the SVLs being distributed approximately every 500 m along the cable. FIG. 2 schematically shows a segment of the cable 100, intended to distribute one of the three phases of a triphase HV electric power distribution line, with associated a plurality of SVLs, like the SVLs 205a and 205b shown in the drawing, positioned at a distance from each other along the cable 100, for example at intervals of approximately 500 m (only two SVLs are shown in the drawing, for avoid unnecessary complication; however several SVLs are typically distributed along the cable). Each SVL has a first end 205' electrically connected to the cable metallic sheath 140, and a second end 205" electrically connected to earth.

The SVL is an ancillary element of an electric power distribution network, implementing a highly non-linear resistor, and, for applications requiring high power dissipation, like in HV electric power distribution systems, it comprises a plurality of metal-oxide discs that are located in columns between said first and second ends, inside a non-metallic housing. An example of SVL suitable for the present invention is MW08 marketed by ABB.

In case the voltage of the metallic sheath 140 raises over the intervention threshold of the SVL (designed to keep the metallic sheath voltage below a few kilovolts), the SVL becomes conductive, and thus, for a brief transient (of the order of few microseconds), it shorts the cable metallic sheath to earth, limiting the sheath voltage to acceptable values. In normal conditions (i.e., when an SVL operates properly), no current flows therethrough, apart during discharges, when the cable experiences overvoltages; thus, normally there is no current circulating along the metallic sheath 140.

SVLs are reliable components. However, a discharge running across the metal-oxide discs causes a partial sinterization of the discs material, said sinterization being directly related to the discharged energy. The sinterized material looses part of its electrical characteristics.

Each SVL can thus withstand a limited number of discharges (nominally and on average, each SVL can survive without damages about eight-ten typical switching surge discharges). As mentioned above, in normal conditions (i.e., when an SVL operates properly) no current flows therethrough, apart during discharges, i.e. when the cable metallic sheath experiences over-voltages. However, when the discharged accumulated energy is sufficiently high, a conductive path is formed across the metal-oxide discs, and the SVL breaks, becoming conductive and thus loosing its protection capabilities.

An out of order SVL causes the establishment of a conductive current path to earth, and thus enables the circulation of currents that unacceptably increase the overall circuit losses. In certain cases, the broken SVL could also blow up, possibly causing damages to the cable and to the surroundings.

For this reason, damaged or out of order SVLs should be replaced as soon as possible, and for this purpose a regular inspection of the SVLs installed on an electric power distribution line should be carried out to ensure that these elements operate properly, and, when a damaged or out of order SVL is detected, it is immediately replaced.

Unfortunately, SVLs are often not easily accessible, or even totally inaccessible to humans, because they are normally installed in protective link boxes, being connected to the (metallic sheath of the) cables by means of dedicated sub-lines; these boxes are usually sealed and bolted, and the cables themselves are not easily accessible. This is rather common in recessed distribution networks.

Referring to FIG. 2, there is schematically shown a fiberoptic monitoring system, adapted to allow remote monitoring of the state of the SVLs used to protect the cable 100, without the need of on-field inspection.

The monitoring system, denoted globally as 210, is a passive, optical-based system, comprising an optical fiber 215 that, starting from a central monitoring unit 220, runs along the cable 100.

In correspondence of each SVL 205a, 205b, first and second optical splitters 223a and 225a, 223b and 225b respectively, are provided along the optical fiber 215. The optical splitters 223a and 225a 223b and 225b are designed to spill a respective, selected fraction I1a and I2a, I1b and I2b of the optical power of an optical radiation they receive in input, in particular a fraction of the optical power I of an optical radiation which is injected into the optical fiber 215 by an optical source 230, for example a laser source, of the central monitoring unit 220, and which propagates through the optical fiber 215.

The fraction I1a, I1b of optical radiation spilled by the first optical splitter 223a, 223b associated with a respective one of the SVLs 205a, 205b are fed to a respective first optical branch associated with that SVL; the first optical branch comprises a length 231a, 231b of optical fiber which is mechanically coupled (attached) to the respective SVL 205a, 205b, and which terminates with a first reflector 233a, 233b. Preferably, the length 231a, 231b of optical fiber of the first optical branch is wound or wrapped around the respective SVL 205a, 205b.

The fraction I2a, I2b of optical radiation spilled by the second optical splitter 225a, 225b associated with the SVL 205a, 205b is fed to a respective second optical branch associated with that SVL; the second optical branch comprises an optical attenuator 235a, 235b and, downstream the optical attenuator 235a, 235b, a second reflector 240a, 240b. When the optical attenuator 235a, 235b is closed (i.e., it is in a first, high attenuation state), it blocks the propagation of the optical radiation fractions spilled by the associated second optical splitters 225a, 225b, preventing the reflection of said radiation by the second reflectors 240a, 240b. The optical attenuators 235a, 235b may be low back-reflection optical shutters. When the optical attenuator 235a, 235b is open (i.e., it is in a second, low attenuation state), it allows the propagation of the optical radiation fractions spilled by the associated second optical splitters 225a, 225b; the spilled optical radiation fractions can thus reach the second reflectors 240a, 240b, and be reflected back by them. An example of optical attenuator suitable for the present invention is the In-Line Optical Fiber Shutter marketed by Phoenix Photonics.

Each of the optical attenuators 235a, 235b is operatively coupled to the respective SVL 205a, 205b in such a way as to be responsive to a change in a physical quantity associated with the SVL. The coupling can be thermal, electrical, magnetic or mechanical, or a combination thereof.

In particular, the optical attenuator 235a, 235b is operatively coupled to the respective SVL 205a, 205b in such a way that an operating condition of the SVLs 205a, 205b to be monitored, for example the passage of a current through the SVLs, induces a change in the state of the associated optical attenuator 235a, 235b. For example, the generic optical attenuator 235a, 235b may be a normally-open optical shutter, that normally (i.e., when no current, or a current below a predetermined threshold, flows through the associated SVL) blocks the optical radiation fed thereto, preventing it from reaching the second reflector 240a, 240b and being reflected; the passage of a current (greater than the predetermined threshold current) through the SVL 205a, 205b causes the optical attenuator 235a, 235b to close, so that the fraction of optical radiation I2a, I2b spilled by the respective second optical splitter 225a, 225b passes through the optical attenuator and reaches the second reflector 240a, 240b, where the optical radiation is back-reflected.

The first and second reflectors 233a and 240a, 233b and 240b are designed to reflect, e.g. by Fresnel reflection, the incident fraction of optical radiation I1a and I2a, I1b and I2b. In particular, the first and second reflectors 233a and 240a, 233b and 240b may be mirror surfaces, obtained by cutting an optical fiber substantially orthogonally (at an angle of 90°±3°) to its longitudinal axis, and, optionally, by advantageously coating the surface thus obtained with a reflecting material, such as dielectric layers or gold. In the case of the presence of a reflecting material, that cut can have a more oblique angle as known to the skilled in the art, for example of 90°±10°. The first or second reflector 233a or 240a, 233b or 240b may be part of a reflective pigtail.

Each of the optical splitters 223a, 225a, 223b, 225b may be an all-fiber device made by coupling two optical fibers, one being the optical fiber 215 that continues along the cable 100, the other being the optical fiber forming the first or the second optical branch associated with the generic SVL to be monitored. The two optical fibers are optically coupled to one another for a certain length; this kind of optical splitter, which has the advantage of being an all fiber device (completely made of optical fibers), works also as an optical coupler, being adapted to re-inject the back-reflected optical radiation I1ar, I2ar, I1br, I2br into the optical fiber 215. As an alternative, micro-optics splitters can be used, with lenses that spill optical radiation from the fiber 215, and partially-reflecting mirrors for re-injecting the back-reflected optical radiation into the fiber.

The central monitoring unit 220 also includes an optical receiver 250, optically coupled to the optical fiber 215 so as to receive and be able to detect a back-reflected optical radiation Ir that propagates along the optical fiber 215 in the direction opposite to the injected optical radiation I. In particular, the optical receiver 250 can comprise an opto-electrical conversion part, that is adapted to convert the detected optical radiation Ir into electrical signals, and a signal processing part, adapted to process the electrical signals resulting from the conversion of the detected back-reflected optical radiation Ir.

The optical receiver 250 may be an OTDR apparatus or an OSA, as discussed in greater detail later on.

The monitoring system 210 operates in the following way.

The optical source 230 of the central monitoring unit 220 injects into the fiber 215 an optical radiation I, at a selected wavelength; the injected optical radiation I propagates through the fiber 215 and, when it reaches the first optical splitter associated with a corresponding SVL, like for example the first optical splitter 223a in correspondence to the SVL 205a, a selected fraction I1a of the optical radiation I is spilled and fed to the first optical branch associated with that SVL; the remaining part of the optical radiation continues to propagate through the fiber 215, to reach the second optical splitter 225a associated with the SVL 205a; here, a selected fraction I2a of the optical radiation is spilled and fed to the second optical branch, while the remaining part of the optical radiation continues to propagate along the fiber 215. The same occurs at each SVL positioned along the cable length.

Considering a generic SVL, e.g. the SVL 205a, in normal conditions (when the SVL operates properly and is not discharging an over-voltage of the metallic sheath 140 of the cable 100) the first optical branch associated therewith is closed, i.e. it lets the spilled fraction I1a of optical radiation to pass, reach the first reflector 233a and be reflected back towards the first optical splitter 223a (in FIG. 2, the back-reflected optical radiation is denoted I1ar; I1br denotes the equivalent of the back-reflected optical radiation for the SVL 205b). The second optical branch associated with the SVL 205a is open in normal conditions (because the optical shutter 235a is normally open), i.e. it blocks the spilled fraction I2a of optical radiation, preventing it from reaching the reflector 240a.

In particular, as long as the considered SVL 205a is not damaged and does not conduct current (because the metallic sheath 140 of the cable 100 does not experience an over-voltage), the spilled fraction of optical radiation I1a in the first optical branch reaches the first reflector 233a, where it is reflected back as a back-reflected optical radiation fraction I1ar towards the first optical splitter 223a, which injects the back-reflected optical radiation I1ar into the optical fiber 215. The optical shutter 235a associated with the SVL 205a remains in the open state, so that the spilled fraction of optical radiation I2a is blocked, and no significant back-reflection takes place in the second optical branch. The back-reflected optical radiation I1ar propagates through the optical fiber 215 back to the central monitoring unit 220, where it is received and detected by the optical receiver 250.

Figure 3A:
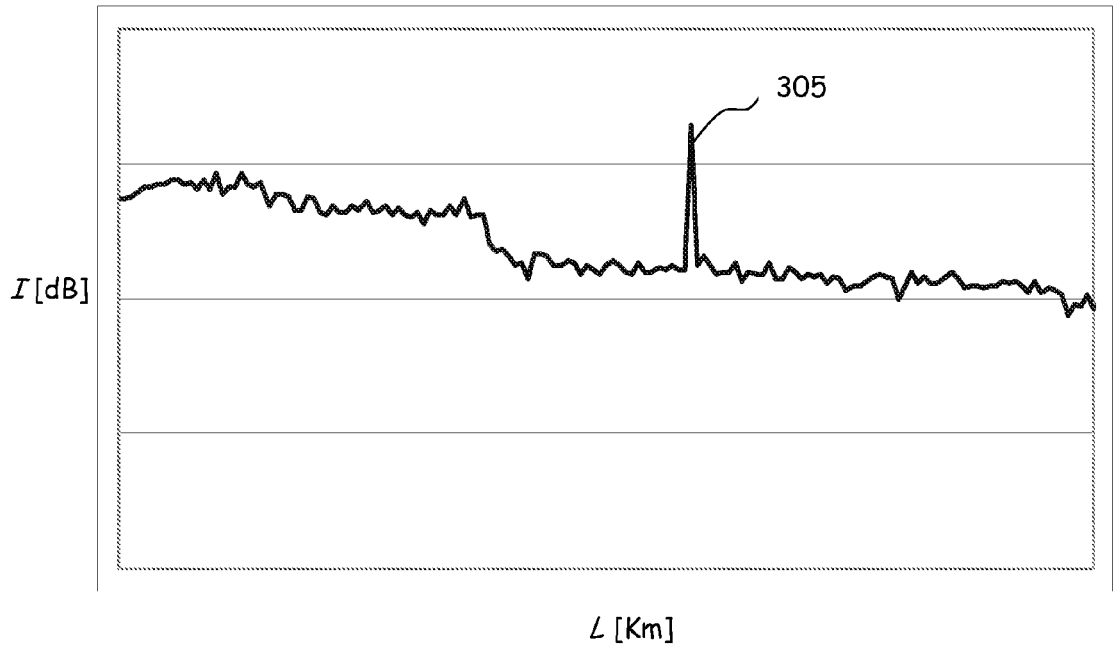
FIGS. 3A-3D are diagrams of different patterns of back-reflected optical radiations that can be detected by an optical receiver of the monitoring system of FIG. 2, adapted to identify different change of states of a monitored component.

An example of a possible optical radiation reflection pattern (reflected optical radiation intensity l, in dB, in ordinate, versus distance L along the optical fiber 215, in Km, in abscissa) detected by the monitoring unit 220 in the condition mentioned above is depicted in FIG. 3A where a peak 305 in the optical radiation reflection pattern is visible, at a position, along the optical fiber 215, that corresponds to the location of the SVL 205a along the cable 100. When such an optical radiation reflection pattern is detected, the SVL 205a is assessed to operate properly, and that no current discharge event is taking place.

On the contrary, when the SVL 205a conducts a current, for example because the SVL is discharging an over-voltage of the metallic sheath 140 of the cable 100 (in this case the SVL becomes conductive for a short transient, and a current burst flows therethrough, then the SVL returns to its non-conductive state), the rise in the SVL temperature due to the current flowing therethrough causes the optical shutter 235a to switch to its closed state; the spilled optical radiation fraction I2a can thus propagate through the second optical branch and reach the second reflector 240a; here, a non-negligible part I2ar of the spilled fraction of optical radiation is reflected back towards the second optical splitter 225a, which injects the back-reflected optical radiation into the optical fiber 215. Provided that the SVL 205 is not damaged or broken by the current burst flowing therethrough, the first optical branch (particularly, the length of optical fiber wound around the SVL 205a) is also not damaged, and continues to allow the spilled optical radiation fraction I1a reaching the first reflector 233a, where it is reflected back as a back-reflected optical radiation fraction I1ar. In detail, the first optical splitter 223a injects the back-reflected optical radiation I1ar into the optical fiber 215. The back-reflected optical radiation that propagates back through the optical fiber 215 is the combination of two contributions, one represented by the back-reflected optical radiation I1ar and the other represented by the back-reflected optical radiation I2ar. The back-reflected optical radiation propagates back to the central monitoring unit 220, where it is received and detected by the optical receiver 250.

Figure 3B:
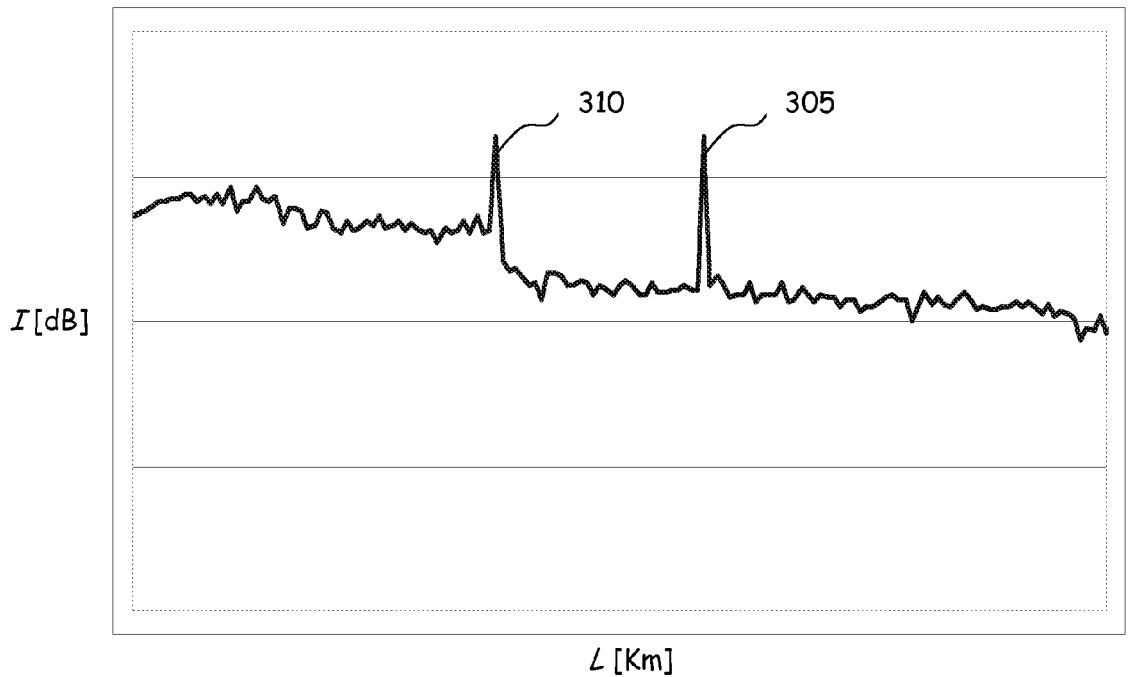

An example of a possible optical radiation reflection pattern detected by the monitoring unit 220 in a situation like this is depicted in FIG. 3B where in addition to the peak 305, a second peak 310 in the reflected optical radiation pattern is visible, at the position, along the optical fiber 215, corresponding to the location of the SVL 205a along the cable 100, but slightly displaced compared to the peak 305, due to the difference in the optical paths followed by the two back-reflected optical radiations I1ar and I2ar. When such an optical radiation reflection pattern is detected, it is possible to assess that the SVL is experiencing a discharge event.

In case the SVL 205a breaks, e.g. blows, the length of optical fiber wound around the SVL 205a in the first optical branch breaks as well, and the spilled optical radiation fraction I1a no longer reaches the reflector 233a; thus, no optical radiation is reflected back by the first optical branch associated with the SVL 205a. Therefore, the peak 305 in the optical radiation reflection pattern detected by the central monitoring unit 220 disappears.

The breaking of the SVL may also cause a damage of the second optical branch. Two possibilities exist.

A first possibility is that the second optical branch associated with the SVL 205a, particularly the optical shutter 235a breaks in such a way that Fresnel reflection may take place where the optical fiber is broken. In this case, a non-negligible part I2ar of the spilled optical radiation fraction I2a is reflected back towards the second optical splitter 225a, which injects the back-reflected optical radiation I2ar into the optical fiber 215. In this case, a peak in the optical radiation reflection pattern is detected by the central monitoring unit 220.

Figure 3C:
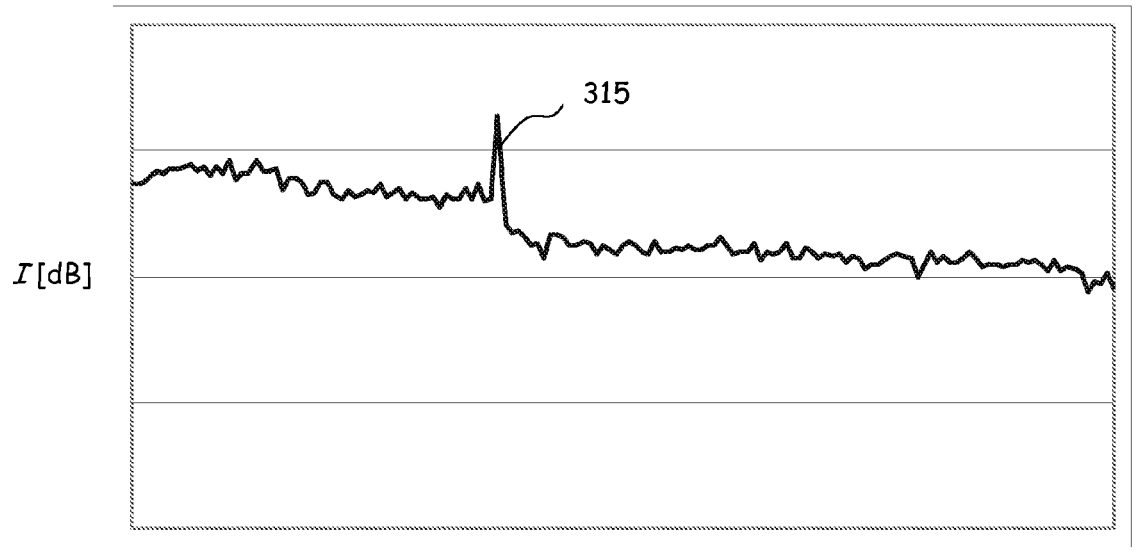

An example of a possible optical radiation reflection pattern detected by the monitoring unit 220 is depicted in FIG. 3C: a second peak 315 in the reflected optical radiation pattern is visible, approximately at the position, along the optical fiber 215, where the peak 310 in FIG. 3B was located.

A second possibility is that the second optical branch associated with the SVL 205a breaks in such a way that Fresnel reflection does not take place where the optical fiber is broken. In this case, the spilled optical radiation fraction I2a is not reflected back towards the second optical splitter 225a, thus no peaks in the optical radiation reflection pattern are detected by the central monitoring unit 220.

Figure 3D:
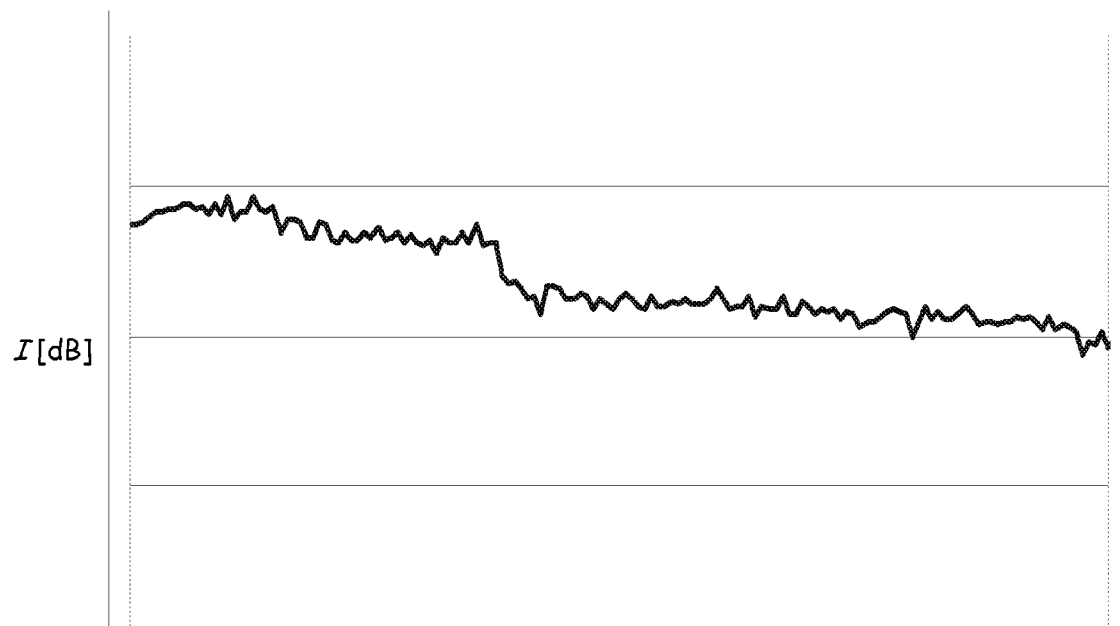

An example of a possible optical radiation reflection pattern detected in this case by the monitoring unit 220 is depicted in FIG. 3D.

In both these two cases, observation of the optical radiation reflection pattern allows assessing that the SVL 205a is broken, and needs to be replaced.

Depending on the nature of the optical receiver 250 in the central monitoring unit 220, different characteristics of the back-reflected optical radiation can be detected, particularly, either intrinsic characteristics of the optical radiation or characteristics imparted to the back-reflected optical radiation by the optical attenuator and/or the reflector.

For example, the central monitoring unit 220 may comprise an OTDR apparatus, which is used as both optical source 230 and optical receiver 250. As known in the art, an OTDR apparatus is an optoelectronic instrument that is often used to characterize optical fibers. The OTDR apparatus is configured to inject a series of optical radiation pulses into the optical fiber 215, or into the first and second optical fibers 415' and 415". The optical radiation pulses propagate through the optical fiber 215, or through the first and second optical fibers 415' and 415"; the optical radiation is reflected back from points in the optical fiber where, due for example to fiber dishomogeneity, the index of refraction changes. The intensity of the return pulses is measured and integrated as a function of time, and is plotted, e.g. on a display device, as a function of fiber length.

Using an OTDR apparatus the characteristic that allows determining the position of the SVL may be the change in time of the intensity of back-reflected optical radiation. In particular, with an OTDR apparatus the position, along the optical fiber 215, or along the first and second optical fibers 415' and 415" (and thus along the cable 100), of the SVL that experienced a change of state results from the position where a reflection peak in the reflection pattern appears/disappears.

As an alternative to the OTDR apparatus, that generates optical radiation pulses, a Correlation OTDR apparatus (COTDR) can be used. As known to those skilled in the art, a COTDR apparatus generates a series of optical radiation pulses and correlates them with the back-reflected optical radiation.

As an alternative to the use of an OTDR or a COTDR, an OSA may be used, in combination with the provision, in the first and second optical branches that are associated with different SVLs, of wavelength-selective optical components. For example, in the first and second optical branches that are associated with a generic SVL, a filter may be associated with the first and second reflectors, so as to allow back-reflection of optical radiation at a selected wavelength, corresponding to that SVL. Thus, the back-reflected optical radiation coming from different SVLs is characterized by a different wavelength, and the OSA can discriminate among the different SVLs based on the different wavelength of the back-reflected optical radiation. The filter may be optical fiber gratings, designed to selectively reflect optical radiation at different wavelengths depending on the SVL, which are used to form the first and second reflectors instead of using high-reflectivity pigtails.

The optical attenuators 235a, 235b in the second optical branches that are associated with the SVLs may be passive thermal optical attenuators. In particular, the optical attenuators 235a, 235b may be all-fiber, "evanescent field" devices.

Using the thermal optical attenuator, an OTDR or COTDR apparatus at the central monitoring unit 220 is capable of identifying which of the SVLs conducts current, or is broken, based on the determination of the location of the peak in the intensity of the back-reflected optical radiation; using an OSA, in combination with optical filters inserted in the first and second optical branches, the SVL can be identified based on the wavelength of the back-reflected optical radiation. Using an OTDR or COTDR apparatus, or an OSA it is also possible to "count" the number of discharge events individually sustained by each of the SVLs, by counting the number of times the reflection peak 310 or 510 appears. In this way it is possible to perform a preventive maintenance of the SVLs: when a generic SVL approaches the maximum number (typically, eight-ten) of discharges that it can sustain without breaking, it is scheduled for replacement.

Other types of optical attenuators can be used as an alternative to thermal optical attenuators, for example optical attenuators based on the electro-optic or magneto-optic effect, or mechanical shutters. Also, two or more different types of optical attenuators may be combined: for example, a thermal optical attenuator may be used in conjunction with an electro-mechanical optical attenuator. More generally, any component adapted to either attenuate and/or block an incident optical radiation, or to let it pass through, can be used.

The optical splitters 223a, 223b, 225a, 225b may have coincident splitting ratio, or, alternatively, each optical splitter may have a peculiar splitting ratio. For example, the splitting ratio of the optical splitters close to the central monitoring unit 220 may be lower than that of the optical splitters located far away from it, so that the peaks in the back-reflected optical radiation intensity corresponding to the SVLs closer to the central monitoring unit 220 are lowered. For example, the optical splitter farthest from the central monitoring unit 220 can have a 50/50 split ratio, whereas the other splitters can have a 20/80 split ratio. In particular, the split ratio may depend on the reflectivity of the reflectors 233a, 233b, 240a, 240b. For example, in case of simple Fresnel reflection at a cut optical fiber edge, the split ratio (i.e., the amount of spilled optical radiation) should be increased, whereas the use of a high-reflectivity pigtail allows reducing the split ratio. The fraction of optical radiation that is spilled at each optical splitter may decrease monotonically as one moves away from the optical source. Also, in order to adjust (reduce) the intensity of the optical radiation that is back-reflected by each reflector 233a, 233b, 240a, 240b, an optical fiber loop may be provided before the reflector: by changing the bending radius of the fiber loop, the optical losses are increased/decreased.

Using the monitoring system 210 shown in FIG. 2, it is possible to monitor the operating condition of ancillary elements spread along an electric power distribution line and, moreover, it is possible to identify which ancillary element is experiencing a physical event on the cable or is broken or near to be broken. The operations of maintenance of the electric power distribution network are thus performed when they are really necessary, and in a more efficient way, so that any possible service interruption is reduced in time and frequency. Furthermore, a preventive maintenance schedule may be set up, aimed at replacing or restoring the ancillary elements before they actually break, when they approach the average maximum operating life.

The monitoring system 210 is completely passive and can be activated by a physical phenomenon generated by, for example, a surge or fault or disturbance, with no need of other external energy feed such as batteries or the like.

The centralized character of the central monitoring unit, that can be located remotely from the electric power distribution line, i.e. not on the field, makes the maintenance of the optical source easy.

As discussed in the "Summary of invention" section of the present description, applying a fiber-optic monitoring system to the components to be monitored may pose some problems. In particular, the components to be monitored may have an irregular shape which does not provide for a suitable surface for mounting the optical elements of the fiber-optic monitoring system. For example, this can be the case of the SVLs which are used for monitoring and protecting the cables of an electric power distribution line.

For example, excessive bending of an optical fiber, which is part of the fiber-optic monitoring system and is to be attached to a component to be monitored, e.g. a surge arrester, may induce bending losses that impair the functionality of the monitoring system as a whole.

SVLs are typical components which generally possess an irregular shape. Therefore, wrapping the length $231a$, $231b$ of the optical fiber directly around and over a respective SVL is substantially impractical since excessive bending of the optical fiber is inevitably caused to occur. Problems may also arise in connection with the mounting of the optical attenuators $235a$, $235b$ onto the SVLs.

In order for the fiber-optic monitoring system to work properly, it should be necessary to ensure that the optical elements of the fiber-optic monitoring system to be associated with the components to be monitored, e.g. the SVLs mentioned above, are maintained in a proper, known and constant (in time) position, in order to guarantee a high probability of detection of the event to be monitored. Therefore, the mounting of the optical elements of the monitoring system should be such as to ensure that the physical change in the SVL produces a relatively high effect on said optical elements, while, on the contrary, the optical losses on the optical paths should be kept low and any cause of breaking of the optical elements (due, for instance, to sharp corners, external access, moisture penetration and the like) should be avoided in order to increase the operating lifetime of the optical elements.

Furthermore, the optical elements need to be protected against possible damages during their operational life, installation, storage and handling, and, moreover, the installation of the optical elements on the SVLs has to be easy too.

According to an embodiment of the present invention, a device is used for applying the optical elements of the fiber-optic monitoring system to the SVLs.

In particular, the device according to an embodiment of the present invention is an adapter that allows the length of the optical fiber—which belongs to the first optical branch mentioned above—to be wrapped around the component to be monitored, without causing excessive bending of said fiber. Moreover, the adapter allows to associate to said component the optical attenuator which belongs to the second optical branch mentioned above.

Figures 4A, 4B, 4C:
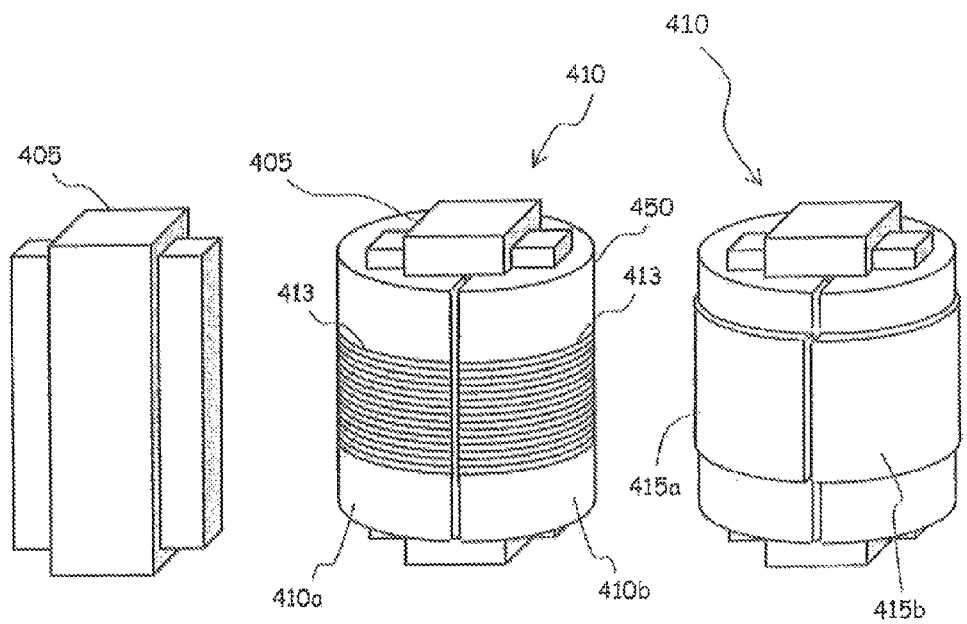
FIGS. 4A, 4B and 4C are stylized views of an SVL and of a device according to an embodiment of the present invention for mounting on the SVL optical fibers of the monitoring system of FIG. 2.

FIG. 4A shows, in a stylized view, an SVL 405 which, for example, may represent one of the SVLs 205a, 205b of FIG. 2. FIG. 4B schematically shows, in a stylized way, an adapter device according to an embodiment of the present invention, said device being mounted on the SVL 405. The adapter device, globally denoted as 410, comprises a shell 450 which has an external substantially cylindrical shape. The adapter device is internally hollow and has a size which is adapted to surround, embrace the SVL 405 by being applied thereon. In particular, the shell 450 is formed of two separated, generically half-cylindrical halves 410a and 410b, which are arranged close to each other so as to surround the outer surface of the SVL 405, leaving exposed the upper and lower ends thereof. The two halves 410a and 410b have an externally rounded, smooth surface, with a bending radius that is suitable for avoiding excessive and dangerous bending of the optical fiber supported by the adapter device. Preferably, said bending radius is higher than 20 mm. More preferably, said bending radius is comprised in the range from about 22 mm to about 30 mm.

In use, the length 231a, 231b of optical fiber of the first optical branch of the monitoring system 210—that is associated with the SVL 405—is wrapped externally around the two halves 410a and 410b of the shell 450. According to an embodiment of the present invention, the smooth surface and the predetermined bending radius of the shell 450 of the adapter device 410 avoid excessive fiber bending and reduce bending losses and fiber breaks. Preferably, the two halves 410a and 410b are provided, on their external surface, with an axial succession of grooves 413 of suitable depth (e.g., 3 mm) adapted to accommodate and keep in a safe and correct position the optical fiber to be wrapped around the shell 450.

The second optical fiber branch of the monitoring system 210, said second branch comprising the variable attenuator 235a, 235b (not visible in FIG. 4B), is accommodated in an inner space provided in-between the SVL 405 and the shell 450 of the adapter device 410. In order to accommodate the second optical fiber branch and the optical attenuator, a housing, e.g. a groove, is preferably formed in the inner surface of one of the two halves 410a, 410b. Further housings can also be provided in one or both of the two halves 410a, 410b for accommodating the first and second reflectors 233a and 240a, 233b and 240b that are associated to the end of the first and second optical branches, respectively.

The optical fibers of the first and second optical branches—that are associated with the SVL—may be part of respective single-fiber cables, which may be secured to the shell 450 of the adapter device 410. Alternatively, only one double-fiber cable may be used which is provided with two optical fibers for making the first and second optical branches mentioned above. A protection may be used to protect the variable attenuator 235a, 235b. A Similar protection may also be provided at the free end of the fiber length 231a, 231b. Preferably, this protection is in the form of a protective glass tube.

The two halves 410a and 410b, once arranged close to each other around and in contact with the SVL 405, may be bound together by means of at least one tying band, for example a couple of straps made of adhesive tape (not shown in the drawing).

According to an embodiment of the present invention, the adapter device 410 is provided with an external protection cover, comprising two cover half-shells 415a and 415b which are adapted to be positioned over, so as to externally embrace each of the two halves 410a and 410b of the shell 450. The two cover half-shells 415a and 415b may be securely held in place by suitable means, like for example screws. Alternatively, an adhesive tape may be used for keeping in place the two cover half-shells 415a, 415b. The final assembly of said embodiment is schematically shown in FIG. 4C. The protection cover formed by the two cover half-shells 415a and 415 protects the optical fiber received within the grooves 413 of the shell 450. The protection cover may be removed if necessary to allow inspection of the optical fiber.

An adapter device according to a further embodiment of the present invention is shown in FIGS. 5, 6A to 6F, 7A, 7B, 8A, 8B, 9A, 9B, and 10.

Figure 5:
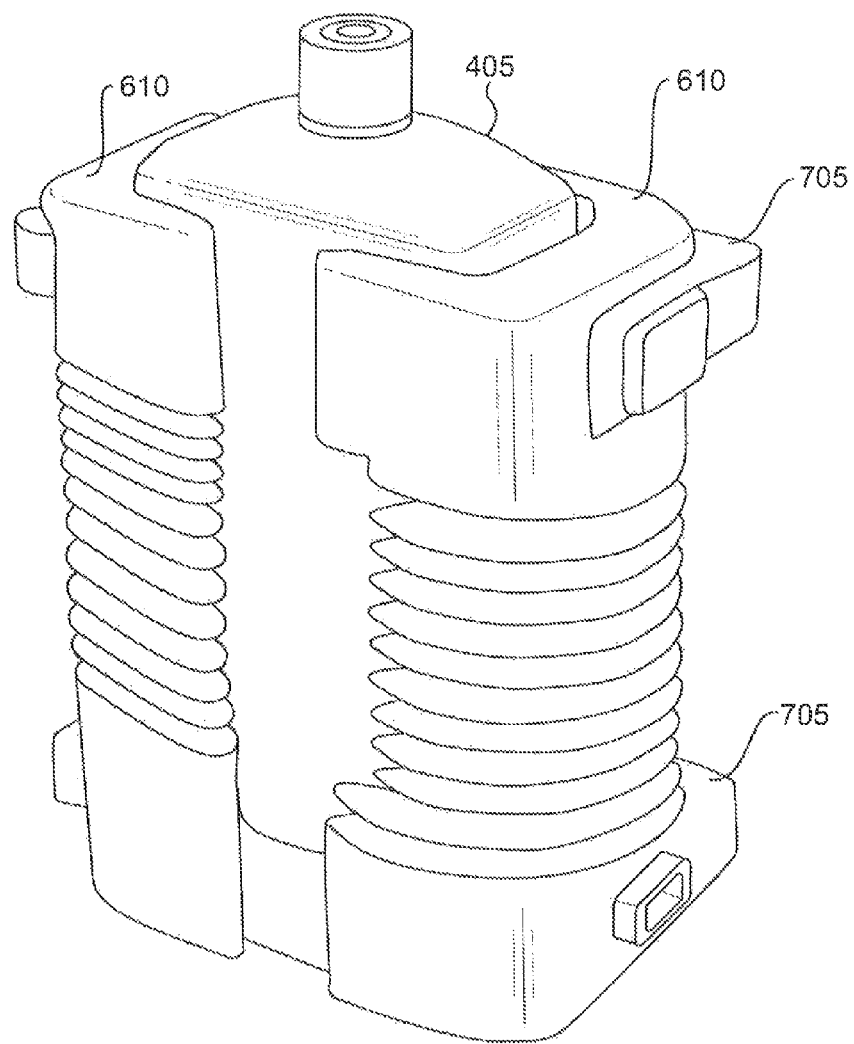
FIG. 5 is a perspective view of another embodiment of a device for mounting optical fibers of the monitoring system of FIG. 2 on an SVL.
Figure 10:
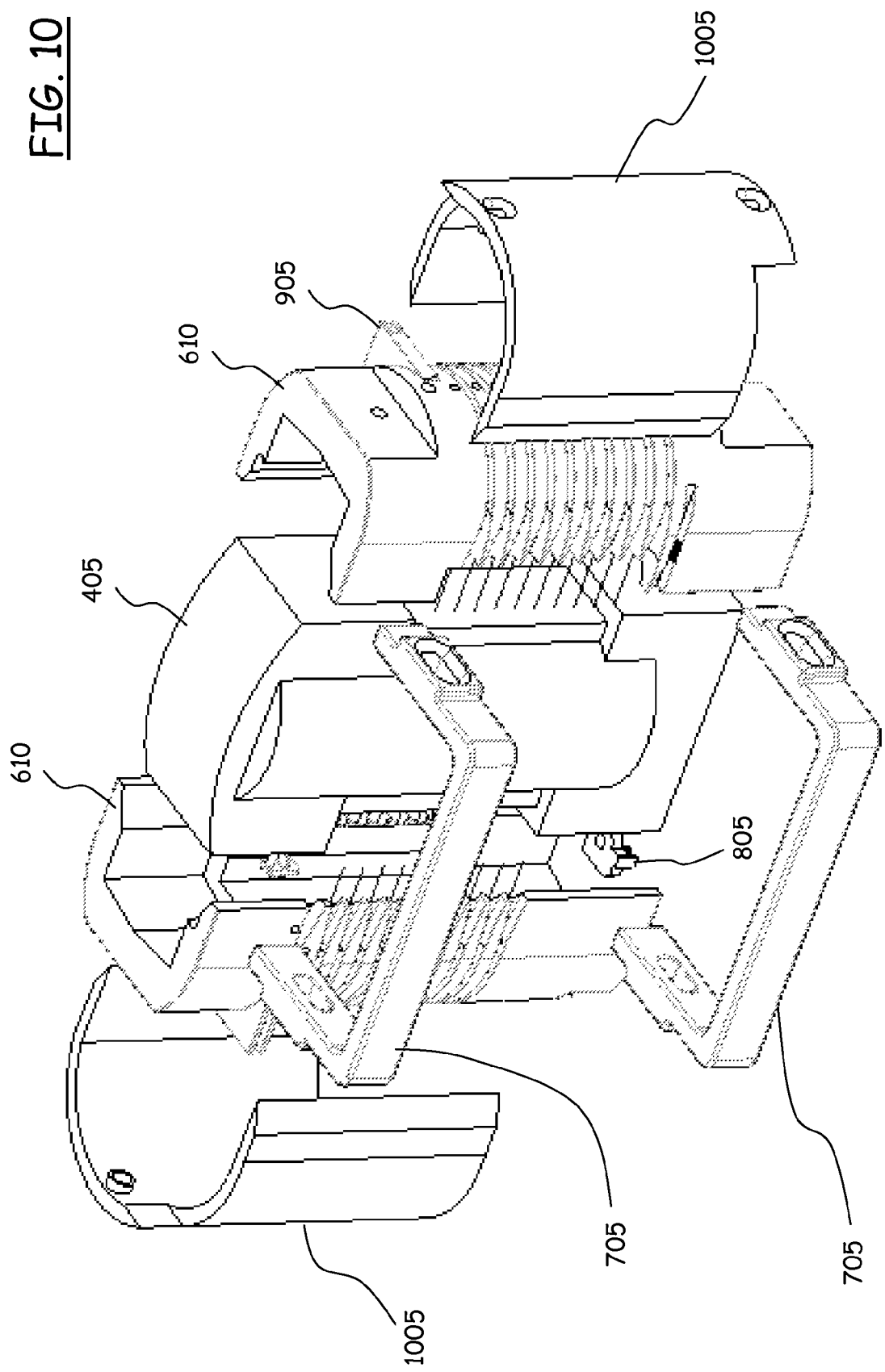
FIG. 10 is an exploded, assonometric view of the device of FIGS. 5 to 9B with external protection cover half-shells.

In particular, FIG. 5 is a perspective view of an adapter device according to an embodiment of the present invention which is assembled on an SVL. The constitutive parts of the device of FIG. 5 are shown in FIGS. 6A to 6F, 7A, 7B, 8A, 8B, 9A, 9B; FIG. 10 shows the adapter device in exploded view, with an external protection cover.

In detail, FIGS. 6A, 6B, 6C, 6D, 6E and 6F depict only one half of the adapter device's shell, respectively, in elevation from the concave side, in elevation from a lateral side, in elevation from the back (convex) side, in elevation from the other lateral side, and in top-plan views from below and from above. Preferably, the two halves 410a, 410b are identical to each other (this aspect being particularly convenient from a manufacturing and inventory management point of view); therefore, only one half has been represented in the figures mentioned above.

As shown in the drawings, each shell half 610 according to said further embodiment has a substantially half-cylindrical shape. In the central portion of the external surface of the body of the shell half 610, an axial succession of grooves 613 is formed, said grooves being adapted to accommodate and keep in position the optical fiber to be wrapped around the shell. The exemplary embodiment shown in the figures is provided with eleven grooves. In particular, all the grooves 613a extend around essentially the whole external surface of the body of the shell half 610, whereas two grooves 613b, 613c extend only across a portion, particularly approximately a half of the external surface of the body of the shell half 610 and the other half of the external surface of the body of the shell half 610, respectively. In detail, the groove 613b is located near the bottom of the shell half 610 and it is the one at which the wrapping of the fiber length 231a, 231b starts, whereas the groove 613c is located near the top of the shell half 610 and it is the one at which the wrapping of the fiber length 231a, 231b ends.

Figures 7A, 7B:
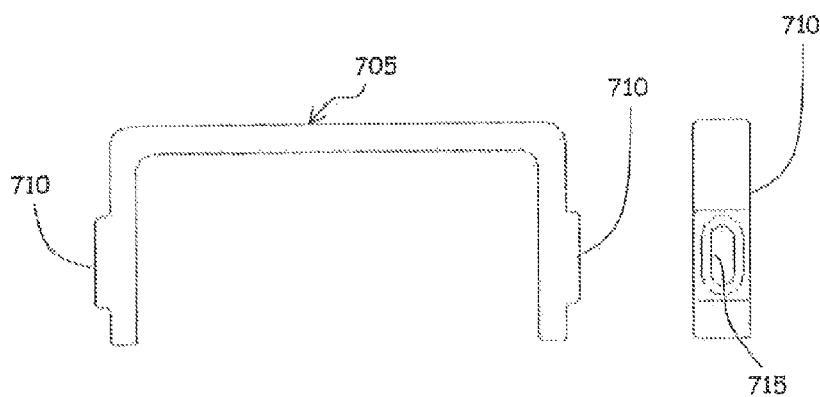
FIGS. 7A and 7B are different views of a bracket for tying together the half shells of the device.

In the top-most and bottom-most parts of the external surface of the body of the shell half 610, respective substantially rectangular recesses 620a and 620b are formed for accommodating tying elements adapted to bound the two shell halves to each other after the latter have been placed around the SVL. In particular, as shown in FIGS. 7A and 7B, the tying elements comprise a pair of brackets 705, of generically "C" shape. In use, the ends 710 of one of the two brackets 705 fit the recesses 620a of the two shell halves, and the ends 710 of the other bracket 705 fit the recesses 620b of the two shell halves. Each recess 620a and 620b has a central hole 625, and the ends 710 of the brackets 705 have a through slot 715 formed therein. In use, when the brackets 705 are positioned with their ends 710 accommodated in the recesses 620a and 620b, the slot 715 of the end 710 of both brackets 705 is aligned with the hole 625 formed in the recess 620a and 620b so that countersunk screws (visible in FIG. 5), for example made of nylon, are inserted into the slots 715 and the holes 625 to retain the brackets 705 in place and properly engaging the two shell halve 610 to the SVL (i.e. to the component to be monitored).

The internal shape of each shell half 610 is adapted to surround, embrace and contact part of the SVL. In particular, the inner concave surface of shell half 610 has approximately planar, opposite later walls 630 joined by a substantially rounded rear wall 635 having a bending radius which substantially matches the bending radius of the SVL. In proximity of one of the two lateral walls 630, a vertically extending recess 640 is formed in the shell half 610, said recess being adapted to accommodate the optical fiber and the associated variable attenuator 235a, 235b of the second optical branch associated with the SVL.

At the top, the half shell 610 is provided with a seat 645 adapted to accommodate a cable grip element for the termination of the optical fiber forming the second optical branch associated with the SVL. The cable grip element is shown in FIGS. 8A and 8B in top-plan and elevation views, respectively, and is globally denoted with reference numeral 805. The cable grip element 805 comprises an appendix 810 having a toothed passage 813 adapted to grip the optical cable—used to form the second optical branch—and to safely hold it even in case of a pulling force acting on the cable. The cable grip element 805 has a central through hole 815, which, when the cable grip element is placed in the seat 645, is aligned with a hole 650 formed in the bottom wall of the seat 645. The cable grip element 805, once positioned in the seat 645, can be firmly held in place by means of a screw, particularly a counter sink head screw (not shown in the drawings), made for example of nylon, whose stem can pass through the through hole 815 of the cable grip element 805 and insert into the hole 650 of the seat 645.

FIGS. 9A and 9B depict, respectively in side and front views, an optical fiber retaining member 905 which may be used to keep in position the length of optical fiber wrapped around the shell. In particular, the optical fiber retaining member 905 has a substantially rectangular shape and it is provided with a tang 910 which is adapted to at least partially penetrate into one of the grooves 613a in order to prevent the optical fiber accommodated thereinto from escaping. The optical fiber retaining member 905 further comprises a projecting pin 915 which is adapted to snap-fit into one of a plurality of holes 655 formed in axial succession in the crests of the grooves 613a. One or more retaining members 905 can be used to retain the optical fiber within the grooves 613a.

In use, the two shell halves 610 are arranged around an SVL to which the fiber-optic monitoring system is associated with. The optical fiber and variable attenuator forming the second optical branch are accommodated in the vertical recess 640 of one of the two shell halves 610 and the termination of the optical fiber cable is secured to the shell half using the cable grip element 805. Then, the two shell halves 610 are tied together by means of the two brackets 705. The optical fiber forming the first optical branch is wrapped around the shell and the optical fiber is accommodated inside the grooves 613a, 613b and 613c. One or more fiber retaining members 905 can be used to keep the optical fiber in position.

Preferably, as visible in FIG. 10, an external protection cover is provided to externally protect the optical fiber wrapped around the two shell halves 610. In particular, in an embodiment of the present invention, the external protection cover comprises two cover half-shells 1005 which are adapted to be positioned over, so as to externally embrace, each of the two shell halves 610. The two cover half-shells 1005 may be securely held in place by suitable means, like for example screws. Alternatively, an adhesive tape may be used for keeping in place the two cover half-shells 1005. The protection cover formed by the two cover half-shells 1005 may be removed if necessary to allow inspection of the optical fiber.

The adapter device according to the present invention guarantees that the optical fibers (and any further optical elements, such as the variable attenuators) of the fiber-optic monitoring system associated with a component to be monitored (such as an SVL) do not suffer from excessive bending which can be due to the irregular shape typically possessed by said component. Moreover, the adapter device of the present invention ensures that the optical fibers (and any further optical elements, such as the variable attenuators) of the fiber-optic monitoring system associated with said component to be monitored and are kept in proper and safe position. This significantly improves the performance of the fiber-optic monitoring system.

The present invention has been here described considering some exemplary embodiments thereof, however those skilled in the art will appreciate that several modifications to the described embodiments, as well as different embodiments of the invention are possible, for example in order to meet contingent needs.

For example, the adapter device may have different shapes, be comprised of a different number of parts (e.g., more than two halves) and have different sizes with respect to the shown and described embodiments.

Also, although reference has always been made to the monitoring of SVLs, the present invention has a more general applicability and can be used to allow the application of a fiber-optic monitoring system to any ancillary component of an electric power distribution line, like for example cable joints. More generally, the present invention can be used to apply a fiber-optic monitoring system to components of any nature (for example, motors) located in different positions.

The invention claimed is:

1. An adapter device capable of applying a fiber-optic monitoring system to a component to be monitored, comprising:
   a shell capable of being adapted to surround the component to be monitored, the shell having a rounded exposed surface; and
   a first optical fiber of the fiber-optic monitoring system, the first opical fiber being wrapped helicoidally around the rounded exposed surface.

2. The adapter device of claim 1, wherein said outer surface comprises grooves capable of accommodating and keeping in position the optical fiber to be wrapped onto the shell.

3. The adapter device of claim 2, comprising at least one optical fiber retaining member capable of being adapted to prevent the first optical fiber from escaping from said grooves.

4. The adapter device of claim 1, comprising an inner seat capable of being adapted to accommodate and keep close to the component to be monitored a second optical fiber of the fiber-optic monitoring system.

5. The adapter device of claim 4, comprising an optical fiber cable grip element capable of being adapted to anchor a free end of the second optical fiber to said shell.

6. The adapter device of claim 1, wherein said shell comprises at least a first and a second shell halves capable of being adapted in use to embrace therebetween the component to be monitored.

7. The adapter device of claim 6, comprising at least one tying member capable of being adapted to tie the at least first and second shell halves to each other.

8. The adapter device of claim 7, wherein said at least one tying member comprises at least one adhesive band.

9. The adapter device of claim 7, wherein said at least one tying member comprises at least one bracket.

10. The adapter device of claim 1, comprising an outer cover capable of being adapted in use to externally cover the exposed surface of said shell.

11. The adapter device of claim 10, wherein said outer cover comprises at least a first and a second cover halves, capable of being adapted in use to embrace therebetween the shell.

12. The adapter device of claim 1, wherein said component to be monitored comprises a surge arrester for electric power distribution lines.

13. A method of monitoring a plurality of components distributed in different space locations comprising providing the adapter device of claim 1, in a system comprising:
   at least one optical fiber path;
   an optical radiation source capable of being adapted to inject optical radiation into the at least one optical fiber path; and
   at least one first and at least one second optical branches branching from the at least one optical fiber path and capable of being adapted to spill respective portions of said optical radiation, the first and second optical branches capable of being adapted to operatively associate with a respective component to be monitored, wherein:
   the first optical branch comprises a first optical reflector capable of being adapted to reflect the spilled optical radiation portion, unless the respective component at least partially breaks;
   the second optical branch comprises:
      at least one passive optical attenuator capable of being adapted to be operatively coupled to the respective component to be monitored, and having an attenuation capable of changing in response to a change in operating conditions of the respective monitored component when operatively coupled thereto, and a second optical reflector; and
   an optical receiver capable of being adapted to detect back-reflected optical radiation reflected by said first and second optical branches.

* * * * *

UNITED STATES PATENT AND TRADEMARK OFFICE
CERTIFICATE OF CORRECTION

PATENT NO.       : 8,391,653 B2
APPLICATION NO.  : 12/745078
DATED            : March 5, 2013
INVENTOR(S)      : Davies et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 344 days.

Signed and Sealed this
Twenty-fourth Day of February, 2015

Michelle K. Lee
*Deputy Director of the United States Patent and Trademark Office*